Feb. 21, 1939. P. C. STECK 2,147,803
FURNACE
Filed March 3, 1938

Inventor
P. C. Steck

By Clarence A. O'Brien
Hyman Berman
Attorneys

Patented Feb. 21, 1939

2,147,803

UNITED STATES PATENT OFFICE 2,147,803

FURNACE

Paul Carl Steck, Staten Island, N. Y.

Application March 3, 1938, Serial No. 193,747

1 Claim. (Cl. 122—155)

The present invention relates generally to new and useful improvements in furnaces of the domestic type and has for its primary object to provide, in a manner as hereinafter set forth, a baffle embodying a novel construction and arrangement whereby the efficiency of the furnace will be greatly increased.

Other objects of the invention are to provide a furnace of the character described which will be comparatively simple in construction, strong, durable, reliable and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
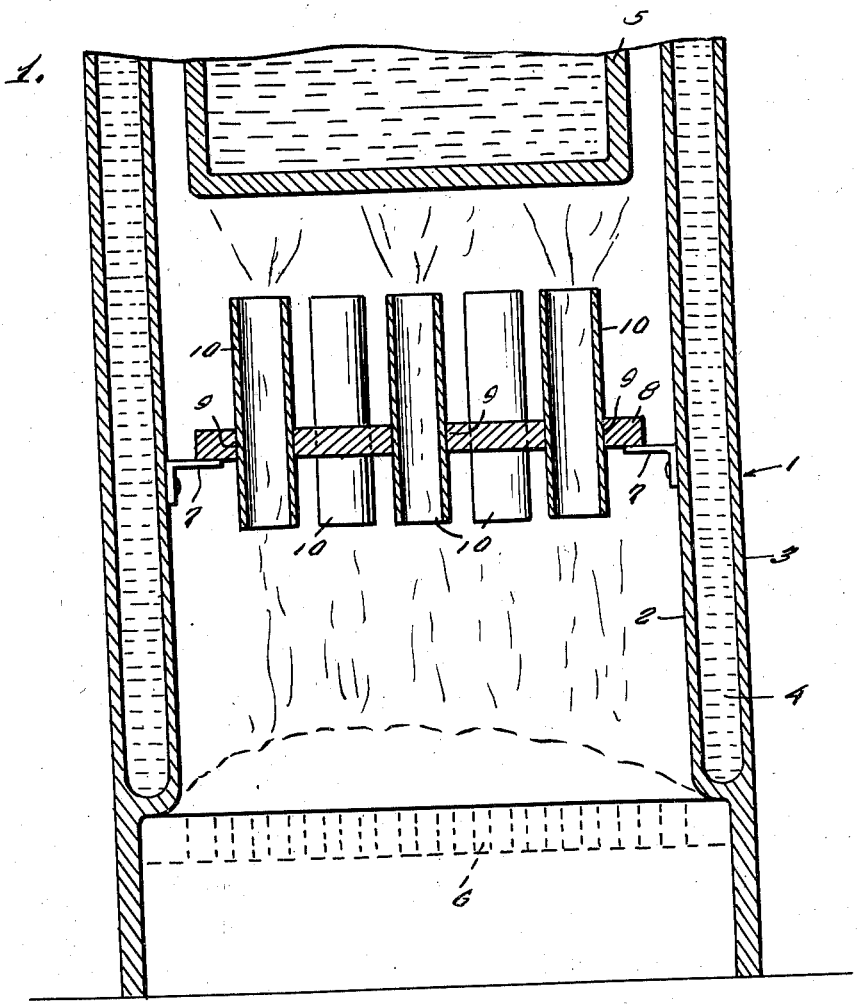
Figure 1 is a view in vertical section through the lower portion of a furnace embodying the present invention.
Figure 2:
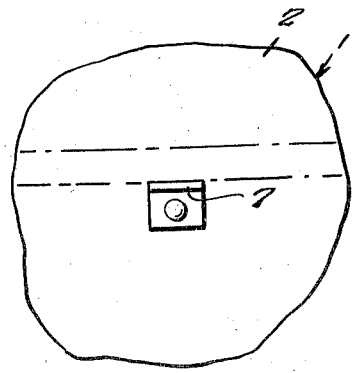
Figure 2 is an elevational view, showing one of the supporting brackets for the baffle.

Referring now to the drawing in detail, it will be seen that the reference numeral 1 designates generally a furnace of conventional construction comprising spaced inner and outer walls 2 and 3, respectively, providing a chamber 4 for the reception of water. The furnace 1 further includes a depending water chamber 5 in its upper portion which is spaced from the inner wall 2.

Fixed on the inner wall 2 of the furnace 1 at a suitable distance above the grate 6 of said furnace is a plurality of brackets 7. Mounted horizontally on the brackets 7 is a baffle 8 in the form of a disk of suitable metal. It will be observed that the periphery of the baffle 8 is spaced from the inner wall 2 of the furnace 1.

The baffle 8 has formed therein a plurality of circular openings 9. Fixed in any suitable manner in each of the openings 9 is a vertical tube 10 which is open at both ends. As illustrated to advantage in Fig. 1 of the drawing, the tubes 10 extend above and below the baffle 8.

It is thought that the manner in which the invention functions will be readily apparent from a consideration of the foregoing. As the heat rises from the fire in the furnace, a portion thereof is directed outwardly by the baffle 8 into contact with the inner wall 2 of the furnace 1, this portion of the heat passing upwardly between the periphery of the baffle and said inner furnace wall. The rest of the heat from the fire is conducted upwardly by the tubes 10 and is concentrated thereby on the surfaces in the upper portion of the furnace.

It is believed that the many advantages of a furnace baffle constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

In combination, a furnace comprising spaced inner and outer walls providing a water chamber, said furnace further including a depending water chamber in its upper portion, a circular baffle plate mounted horizontally in the furnace at an intermediate point in spaced relation to the inner wall thereof, and vertical tubes extending through the plate and projecting above and below said plate, the upper ends of said tubes being spaced below the second named water chamber.

PAUL CARL STECK.